(No Model.)
M. C. MALONE.
PRUNING IMPLEMENT.
No. 380,583. Patented Apr. 3, 1888.
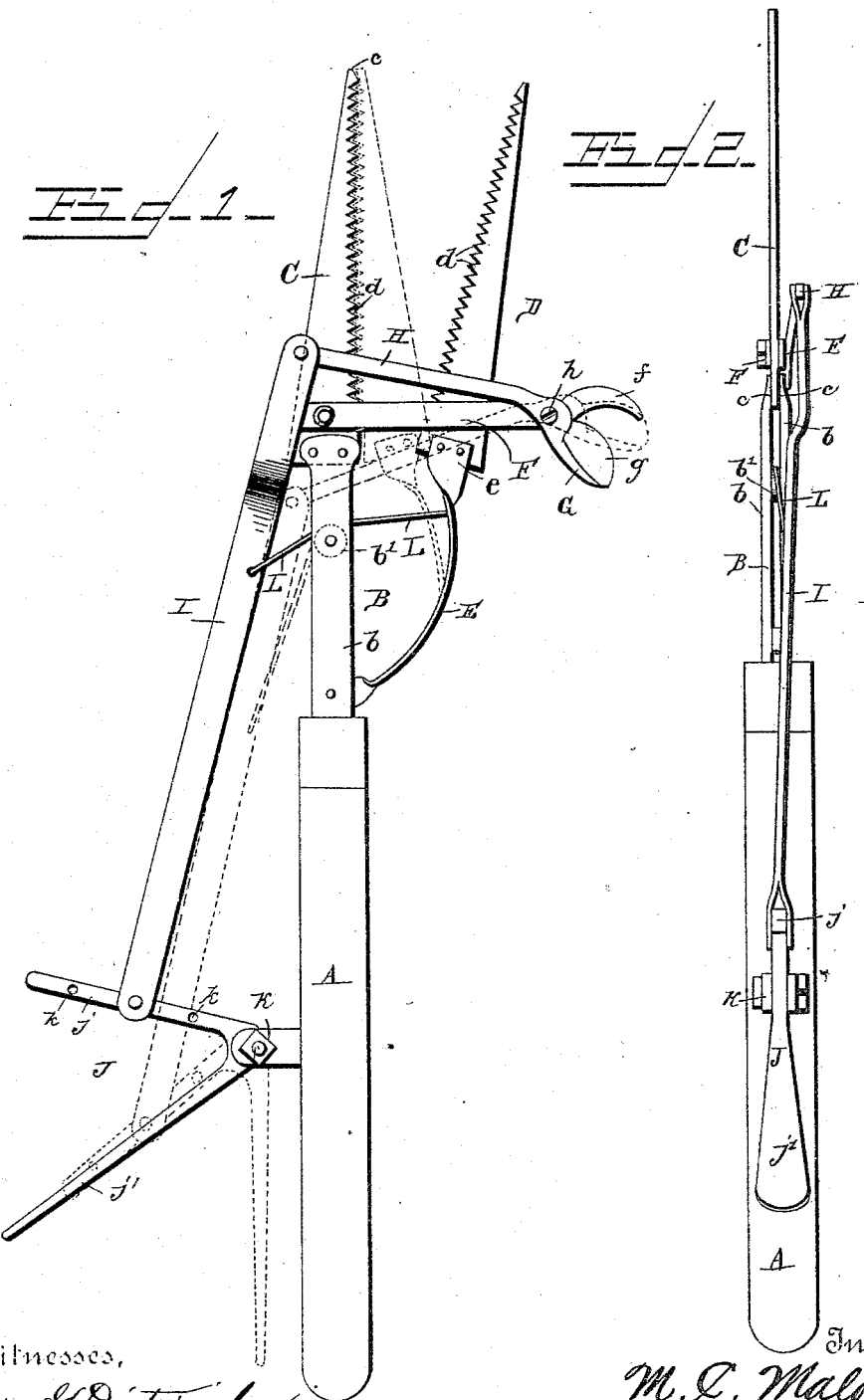

UNITED STATES PATENT OFFICE.

MICAJAH C. MALONE, OF PALMYRA, ILLINOIS.

PRUNING IMPLEMENT.

SPECIFICATION forming part of Letters Patent No. 380,583, dated April 3, 1888.

Application filed November 29, 1887. Serial No. 256,455. (No model.)

*To all whom it may concern:*

Be it known that I, MICAJAH C. MALONE, a citizen of the United States, residing at Palmyra, in the county of Macoupin and State of Illinois, have invented a new and useful Improvement in Pruning-Tools, of which the following is a specification.

The invention relates to improvements in pruning implements, the object being to combine the knife and saws used in pruning in one simple and compact implement; and it consists in the construction and novel combination of parts hereinafter described, illustrated in the accompanying drawings, and pointed out in the appended claims.

In the drawings, Figure 1 represents a side view of the compound tool with the jaws open, the jaws being shown closed in dotted lines. Fig. 2 represents a detail view to show the pulley and the bifurcated guide-bar to which the knife lever-arm is pivoted.

Referring to the drawings by letter, A designates the handle of the utensil, having the shank B secured firmly to its inner end, and composed of the two plate-bars $b\,b$, having the pulley $b'$ at a proper point between them, the shaft of said pulley being journaled in the plate-bars.

C is the upper jaw of the tool, having its heel bolted between the ends of the plate-bars $b\,b$, and with its edges converging thence to the point $c$.

D is the lower jaw, shaped similarly to the upper jaw, of equal size therewith, and having its heel bolted between the arms of the bifurcated free end $e$ of the leaf-spring E, the outer end of which is bolted between the plate-bars of the shank adjacent to the handle. The jaws are provided on their meeting edges with the similar saw-teeth, $d\,d$, and the leaf-spring is so constructed and arranged that when the jaws are closed their outer meeting edges will come squarely together from heel to point.

F is a bifurcated guide-bar, the arms of which straddle the upper saw near the heel thereof and are securely bolted thereto. The said guide-bar extends from the upper saw, and has the shearing-hook $f$ at its end, the concavity of said hook being toward the handle. The lower saw moves between the arms of said guide-bar, and is thereby kept while moving in the same plane as the upper saw.

G is a pruning-knife having a convex edge, $g$, which shears against the concave edge of the hook $f$. The said knife is provided with a lever-arm, H, pivoted at $h$, adjacent to the base of the knife, upon the side of the guide-bar F. The end of said lever-arm H is pivoted to one bifurcated end of a long link-bar, I, the other bifurcated end of which is pivoted on the outstanding arm $j$ of an angle-lever, J, the other arm, $j'$, of which lies adjacent to the handle, and is in position to be grasped together therewith by the hand of the operator. The said lever J is pivoted at its angle upon a stud, K, secured to and outstanding from the handle, and the arm $j$ of said lever is provided with a series of adjusting-openings, $k$, to any one of which the adjacent end of the link-bar I may be attached to lengthen or shorten the throw of the knife and lower saw.

L is a rope, preferably of wire, having one end secured to the spring-arm E near the heel of the attached saw-blade D, running thence over the pulley $b'$, and with its other end attached at a suitable point to the link-bar I.

It is evident that when the operator closes the arm $j'$ of the angle-lever J against the handle the knife, by means of its lever-arm and the link-bar, will be caused to shear against the hook $f$, and the lower jaw, by means of the wire rope and pulley, will have its saw-edge drawn to that of the upper jaw. In cutting off a limb the upper jaw is placed upon the same and the lower jaw by the described means is brought against the under side thereof. Then, by reciprocating the tool in the usual manner, the limb will be cut into both above and below, the lower jaw closing up as the distance between the jaws grows less. When the lower jaw binds in its kerf, the angle-lever should be released from the hand. The spring will then move said jaw out of the kerf and the sawing can be completed by the upper jaw alone. When about to use the knife only, the saw-blades may be unbolted and the pulley $b'$ unseated, or the latter may be unseated only.

The device thus constructed forms a simple and compact pruning-tool, combining the knife and saws necessary for that purpose.

Having described my invention, I claim—

1. In a pruning-tool, the combination of the saw-blade firmly secured to the shank, the similar and opposing saw-blade secured to the free end of a leaf-spring, having its other end secured to the shank, the knife having its arm pivoted upon a bar secured to the fixed saw-blade, and mechanism, substantially as described, whereby both the movable saw-blade and the knife may be operated simultaneously, substantially as specified.

2. In a pruning-tool, the combination, with the handle, shank, and saw-blade firmly secured to the shank, of the leaf-spring, the saw-blade secured to the free end of said spring, the pulley journaled to the shank, the angle-lever pivoted to a stud secured to the handle, the link-bar pivoted on the outstanding arm of said lever, and the wire or rope connecting said link-bar and the free end of the leaf-spring and running against the said pulley on its outer edge, substantially as specified.

3. In a pruning-tool, the combination, with the handle, the shank secured thereto, the saw-blade secured to said shank, and the bifurcated guide-bar secured to said saw-blade, of the leaf-spring secured to the shank at its inner end, the saw-blade secured to the free end of said spring and moving between the arms of the guide-bar, and means, substantially as described, whereby the saw-blade secured to the spring is drawn to the fixed saw-blade, substantially as specified.

4. In a pruning-tool, the combination, with the handle, the shank, and the guide-bar secured to the saw-blade fixed to said shank, and having on its end the hook with its concavity facing the handle, of the convex-edged knife provided with a lever-arm and pivoted at its junction with the said arm to the guide-bar immediately to the inner side of the hook, the link-bar pivoted to the end of said lever-arm, and the angle-lever pivoted at its angle to a stud secured to the handle and having in its outstanding arm a series of adjusting-openings for the attachment of the adjacent end of the link-bar, substantially as specified.

5. In a pruning-tool, the handle, the rigid saw-blade, and the rigid pruning-hook secured to said blade, combined with the movable saw-blade, the pivoted shearing-knife, and the operating-lever connected to both the movable saw-blade and the pivoted shearing-knife, as set forth.

In testimony that I claim the foregoing as my own I have hereto affixed my signature in presence of two witnesses.

MICAJAH C. MALONE.

Witnesses:
THOMAS J. SIMPSON,
JOSEPH RICE.